United States Patent
Warkentin et al.

(10) Patent No.: US 10,698,783 B2
(45) Date of Patent: Jun. 30, 2020

(54) VIRTUALIZATION DETECTION IN A COMPUTING SYSTEM

(71) Applicant: VMware, Inc., Palo Alto, CA (US)

(72) Inventors: Andrei Warkentin, North Andover, MA (US); Cyprien Laplace, Boston, MA (US); Regis Duchesne, Monts-de-Corsier (CH); Ye Li, Newton Highlands, MA (US); Alexander Fainkichen, Southborough, MA (US)

(73) Assignee: VMware, Inc., Palo Alto, CA (US)

( * ) Notice: Subject to any disclaimer, the term of this patent is extended or adjusted under 35 U.S.C. 154(b) by 124 days.

(21) Appl. No.: 15/865,770

(22) Filed: Jan. 9, 2018

(65) Prior Publication Data

US 2019/0213095 A1     Jul. 11, 2019

(51) Int. Cl.
*G06F 9/455*    (2018.01)
*G06F 11/30*    (2006.01)
*G06F 13/10*    (2006.01)

(52) U.S. Cl.
CPC ........ *G06F 11/301* (2013.01); *G06F 9/45558* (2013.01); *G06F 13/105* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 2016/0048680 A1* | 2/2016 | Lutas | G06F 21/554 726/23 |
| 2016/0170816 A1* | 6/2016 | Warkentin | G06F 9/544 719/320 |
| 2016/0170912 A1* | 6/2016 | Warkentin | G06F 13/24 726/17 |

* cited by examiner

*Primary Examiner* — Diem K Cao
(74) *Attorney, Agent, or Firm* — Patterson + Sheridan, LLP (57) ABSTRACT

A method of detecting virtualization in a computing system, which includes a processor having at least three hierarchical privilege levels including a third privilege level more privileged than a second privilege level, the second privilege level more privileged than a first privilege level, is described. The method includes: executing a program on the processor at a privilege level less privileged than the third privilege level, the program including a load-exclusive instruction of the processor, followed by at least one instruction of the processor capable of being trapped to the third privilege level, followed by a store-exclusive instruction of the processor; and determining presence or absence of virtualization software at least a portion of which executes at the third privilege level in response to a return status of the store-exclusive instruction.

20 Claims, 4 Drawing Sheets

VIRTUALIZATION DETECTION IN A COMPUTING SYSTEM

BACKGROUND

A computing system can include an operating system (OS) executing on a hardware platform, which includes processor(s), memory, storage, input/output (IO) devices, and the like. When the OS executes directly on the hardware platform, the OS is referred to herein as a "host OS." Computer virtualization is a technique that involves encapsulating the hardware platform of the computing system into virtual hardware platforms on which virtual machine(s) execute under control of virtualization software. A virtual machine (VM) provides virtual hardware abstractions for processor, memory, storage, and the like to a guest operating system (OS) and guest application(s) that run on the guest OS. The virtualization software provides virtual hardware platforms and virtual execution environments for the virtual machine(s).

Therefore, an OS can execute as a host OS directly on a hardware platform, or as a guest OS on a virtual hardware platform managed by virtualization software. On some hardware platforms, it is not trivial for an OS to recognize the use of virtualization software in safe manner. While some virtualization software may advertise its presence to an OS via side channels (e.g., using Advanced Configuration and Power Interface (ACPI) tables), other virtualization software may not. It is desirable for an OS to be able to detect the presence or absence of virtualization in a safe manner.

SUMMARY

One or more embodiments provide virtualization detection in a computing system. In an embodiment, a method of detecting virtualization in a computing system, which includes a processor having at least three hierarchical privilege levels including a third privilege level more privileged than a second privilege level, the second privilege level more privileged than a first privilege level, is described. The method includes: executing a program on the processor at a privilege level less privileged than the third privilege level, the program including a load-exclusive instruction of the processor, followed by at least one instruction of the processor capable of being trapped to the third privilege level, followed by a store-exclusive instruction of the processor; and determining presence or absence of virtualization software at least a portion of which executes at the third privilege level in response to a return status of the store-exclusive instruction.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
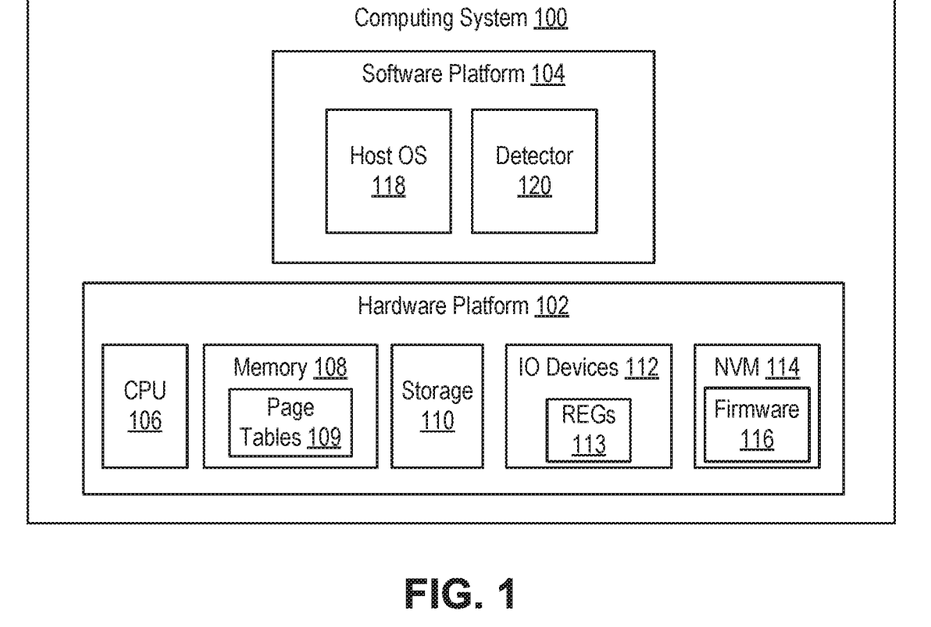
FIG. 1 is a block diagram depicting a computing system according to an embodiment.

FIG. 1 is a block diagram depicting a computing system 100 according to an embodiment. Computing system 100 includes a software platform 104 executing on a hardware platform 102. Hardware platform 102 may include conventional components of a computing device, such as a central processing unit (CPU) 106, system memory ("memory" 108), storage 110, input/output (10) devices 112, a nonvolatile memory (NVM) 114. CPU 106 is configured to execute instructions, for example, executable instructions that perform one or more operations described herein and may be stored in memory 108 and storage 110. Memory 108 is a device allowing information, such as executable instructions, virtual disks, configurations, and other data, to be stored and retrieved. Memory 108 may include, for example, one or more random access memory (RAM) modules. Storage 110 includes local storage devices (e.g., one or more hard disks, flash memory modules, solid state disks, and optical disks) and/or a storage interface that enables computing system 100 to communicate with one or more network data storage systems. Examples of a storage interface are a host bus adapter (HBA) that couples computing system 100 to one or more storage arrays, such as a storage area network (SAN) or a network-attached storage (NAS), as well as other network data storage systems. IO devices 112 include conventional interfaces known in the art, such as one or more network interfaces, serial interfaces, universal serial bus (USB) interfaces, and the like. NVM 114 is a device allowing information to be stored persistently regardless of the state of power applied to computing system 100 (e.g., FLASH memory or the like). NVM 114 stores firmware 116 for computing system 100, such as a Basic Input/Output System (BIOS), Unified Extensible Firmware Interface (UEFI), or the like.

Figure 2:
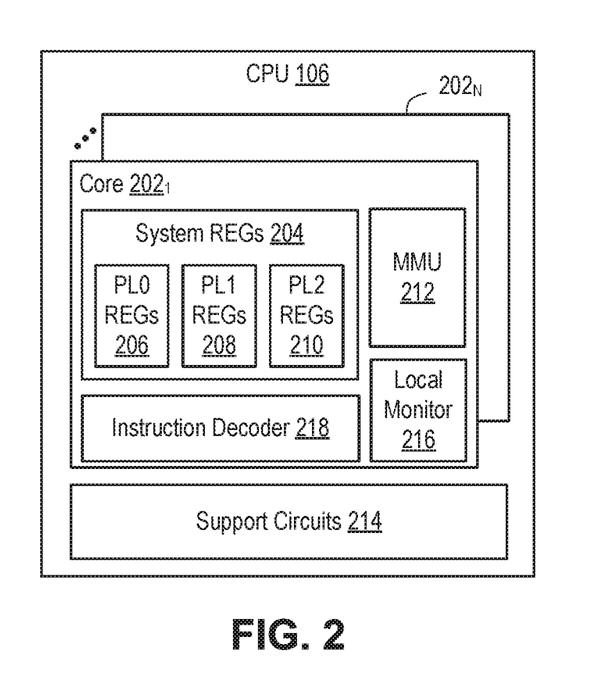
FIG. 2 is a block diagram depicting a central processing unit (CPU) according to an embodiment.

FIG. 2 is a block diagram depicting CPU 106 according to an embodiment. CPU 106 includes one or more cores 202 (e.g., cores $202_1 \ldots 202_N$, where N is an integer greater than zero) and support circuits 214. Each core 202 is a microprocessor or like type processor element. Each core 202 includes, among other components, system registers 204, a memory management unit (MMU) 212, a local monitor 216, and an instruction decoder 218. Other components of core 202 (e.g., an arithmetic logic unit (ALU), floating point unit (FPU), program registers, cache memory, etc.) are omitted for clarity. Support circuits 214 include circuitry shared by cores $202_1 \ldots 202_N$, such as cache memory, direct memory access (DMA) circuits, interrupt controller circuits, an input/output MMU (IOMMU), and the like.

Code is executed on a core 202 at a particular privilege level (PL) of a hierarchy of at least three privilege levels. In an embodiment, each core 202 is a processing element ("processor") compliant with the ARM®v8 architecture or the like that includes four PLs known as exception levels (ELs), which are defined as EL0, EL1, EL2, and EL3 in order of increasing code-execution privilege. Execution at EL0 is referred to as "unprivileged execution" and execution at any of EL1, EL2, and EL3 is referred to as "privileged execution." EL0 is an example of a "user PL;" EL1 is an example of a "supervisor PL;" EL2 is an example of a "hypervisor PL;" and EL3 is an example of a "secure PL." In general, each core 202 supports a hierarchy of at least three hierarchical privilege levels having distinguishable code execution privileges, such as a user PL, a supervisor PL, and a hypervisor PL. Various examples described herein refer to a processor (e.g., a core 202) having the ARM®v8 hardware architecture and executing in the 64-bit execution state (referred to as AArch64). It is to be understood that the virtualization detection techniques described herein can be employed by executing programs on processors having similar hardware architectures consistent with the functional description herein. For example, the techniques described herein can be used with a processor having the ARM®v8 hardware architecture and executing in the 32-bit execution state (referred to as AArch32). The techniques described herein can be used with other types of processors, such as processors compliant with the Power Architecture®.

System registers 204 include registers for use by code to configure and control core 202. System registers 204 are associated with different privilege levels. System registers 204 include PL0 registers 206, PL1 registers 208, and PL2 registers 210 (PL3 registers are omitted for clarity). PL0 registers 206 are accessible by code executing at any privilege level. PL1 registers are accessible by code executing at PL1 or above. PL2 registers are accessible by code executing at PL2 or above. PL2 registers 210 include register(s) or field(s) of registers that control whether the PL2 privilege level is enabled. PL2 registers 210 also include register(s) or field(s) of registers that control traps of PL0/PL1 register access to PL2. When a trap is enabled, core 202 generates an exception to PL2 if program code executing at PL0 or PL1 accesses certain PL0 registers and/or certain PL1 registers associated with the trap.

Instruction decoder 218 supports an instruction set of core 202. Instruction decoder 218 decodes input instructions and controls functional units of core 202 to perform the input instructions. The instruction set of core 202 can include branch instructions, exception generating instructions, system instructions, data processing instructions, load and store instructions, and the like. In an embodiment, the instruction set of core 202 includes one or more pairs of load-exclusive and store-exclusive instructions. A load-exclusive instruction reads a value from a memory address addr into a register. In response, core 202 marks the memory address addr for exclusive access by setting local monitor 216. Local monitor 216 implements a state machine having two states, i.e., an exclusive access state (i.e., a set state) and an open access state (i.e., an unset state). A store-exclusive instruction performs a conditional store of a value in a register to the memory address addr that depends on the state of local monitor 216. If local monitor 216 is set (i.e., in the exclusive access state), the store-exclusive instruction succeeds and local monitor 216 is unset. If local monitor 216 is unset when the store-exclusive instruction is executed, no store operation takes place and the store-exclusive instruction fails. The return status of the store-exclusive instruction can be read from a register of core 202. Different actions can clear local monitor 216, such as a write to the memory address addr after local monitor 216 has been set for that memory address or the execution of a clear-exclusive instruction. In an embodiment, an exception generated by core 202 also clears local monitor 216. For example, the A64 instruction set of an ARM®v8-compliant processor includes an LDXR instruction for exclusive loads and a corresponding STXR instruction for exclusive stores. The A32 instruction set of an ARM®v8-compliant processor, as well as other types of processors, include similar load-exclusive and store-exclusive instructions.

MMU 212 implements memory management in the form of paging of memory 108. MMU 212 controls address translation and access permissions for memory accesses made by core 202. MMU 212 implements a plurality of address translation schemes based on privilege level (also referred to as "translation schemes"). Each translation scheme generally takes an input address (IA) and, if permitted based on the defined access permissions, returns an output address (OA). If an address translation cannot be performed (e.g., due to violation of the access permissions), MMU 212 generates an exception. MMU 212 is controlled by one or more of system registers 204. MMU 212 can include one or more translation lookaside buffers (TLBs) (not shown) that cache address translations. One type of translation scheme includes a single stage of address translation that receives a virtual address (VA) in a virtual address space and outputs a physical address (PA) in a physical address space. The virtual address space is a flat logical address space managed by software. The physical address space includes the physical memory map that includes memory 108. Another type of translation scheme includes two stages of address translation. The first stage of address translation receives a VA and outputs an intermediate physical address (IPA) in an intermediate physical address space. The second stage of address translation receives an IPA and outputs a PA. The IPA address space is a flat logical address space managed by software.

Returning to FIG. 1, software platform 104 includes a host operating system (OS) 118 and a detector 120. Host OS 118 executes directly on hardware platform 102. Host OS 118 or portions thereof execute at PL1. Host OS 118 can be any commodity operating system known in the art, such as such as Linux®, Microsoft Windows®, Mac OS®, or the like. Detector 120 comprises program code executable by CPU 106 to detect virtualization in software platform 104. Host OS 118 executes detector 120 in a process or thread on core 202. In general, detector 120 is a program executed by core 202. Detector 120 can execute at PL0 or PL1. Operation of detector 120 is described further below. In computing system 100, there are no software components executing at PL2.

At power-on of computing system 100, firmware 116 performs initialization of hardware platform 102. Firmware 116 hands of execution to a bootloader of host OS 118. The bootloader performs various initialization tasks, including enabling the virtual memory system of CPU 106 and the generation of page tables 109. The bootloader configures MMU 212 to implement the single-stage address translation scheme using page tables 109. Page tables 109 map virtual addresses to host physical addresses in the physical memory map of hardware platform 102. IO devices 112 include control registers ("REGs 113") that are accessible in the physical memory map of hardware platform 102 (e.g., memory-mapped IO (MMIO)). Entries in page tables 109 differentiate between "normal memory" (e.g., addresses in memory 108) and "device memory" (e.g., addresses mapped to REGs 113).

Figure 3:
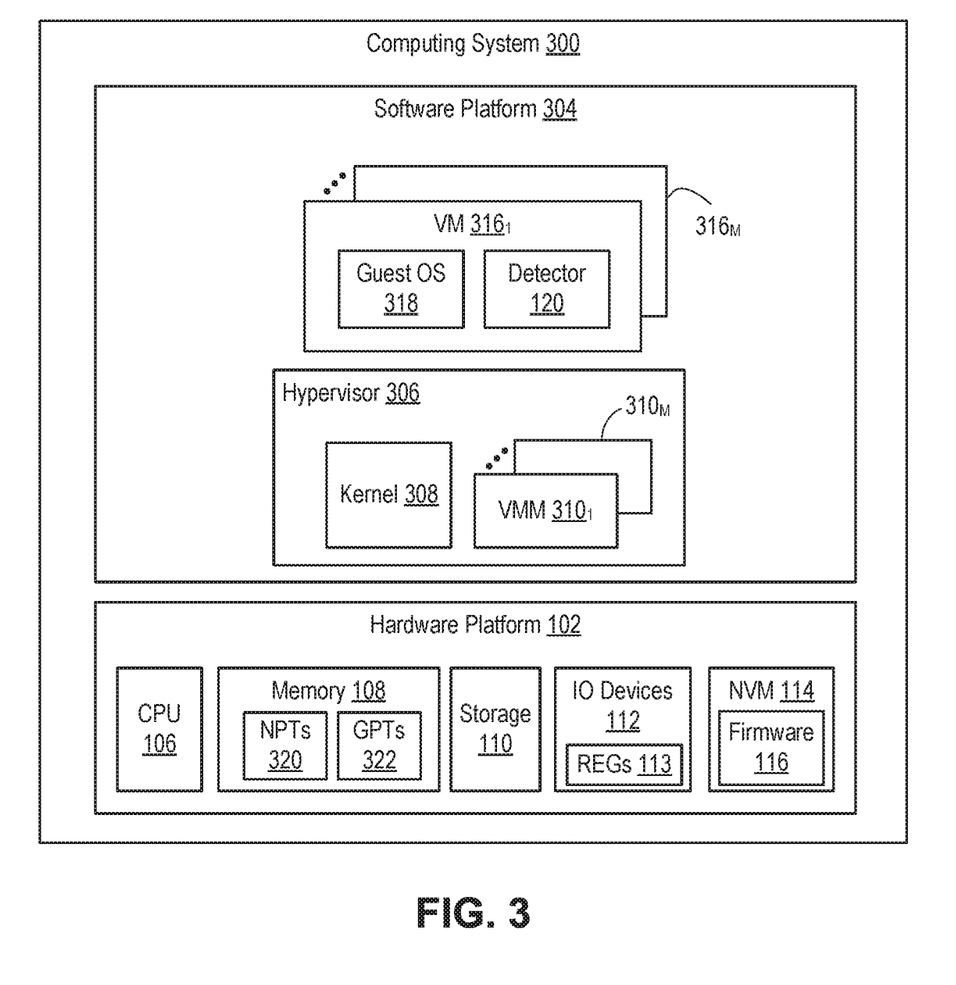
FIG. 3 is a block diagram depicting a computing system according to another embodiment.

FIG. 3 is a block diagram depicting a computing system 300 according to an embodiment. Elements of FIG. 3 that are the same or similar to those of FIG. 1 are designated with identical reference numerals. Computing system 300 includes a software platform 304 executing on hardware platform 102. Hardware platform 102 is configured as described above with respect to FIGS. 1-2.

Software platform 304 includes a virtualization layer that abstracts processor, memory, storage, and networking resources of hardware platform 102 into one or more virtual machines ("VMs") $316_1 \ldots 316_M$ (collectively VMs 316) that run concurrently on computing system 300. VMs 316 run on top of the virtualization layer, referred to herein as a hypervisor 306, which enables sharing of the hardware resources by VMs 316. One example of hypervisor 306 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Hypervisor 306 is known as a Type-1 or "bare-metal" virtualization software.

Each VM 316 supported by hypervisor 306 includes guest software that runs on the virtualized resources supported by hardware platform 102. In the example shown, the guest software of each VM 316 includes a guest OS 318 and detector 120. Guest OS 318 can be any commodity operating system known in the art, such as such as Linux®, Microsoft Windows®, Mac OS®, or the like.

Hypervisor 306 includes, among other components, a kernel 308 and virtual machine monitors (VMMs) $310_1 \ldots 310_M$ (collectively VMMs 310). Kernel 308 provides operating system functionality (e.g., process creation and control, file system, process threads, etc.), as well as CPU scheduling and memory scheduling. VMMs 310 are processes scheduled by kernel 308 to implement the virtual system support for VMs 316. Each VMM 310 manages a corresponding virtual hardware platform. The virtual hardware platform includes virtual CPUs (vCPUs), guest physical memory, virtual IO devices, and the like. In embodiments, kernel 308 executes at PL2 or PL1; VMMs execute at PL2; guest OS 318 in each VM 316 executes at PL1; and detector 120 executes at PL1 or PL0.

In an embodiment, guest software in a VM 316 accesses memory using a two-stage address translation scheme. In this context, a virtual address is referred to as a "guest virtual address" or GVA. An intermediate physical address is referred to as a "guest physical address" or GPA. A physical address is referred to as a "host physical address" or HPA. Hypervisor 306 maintains nested page tables (NPTs) 320, and each guest OS 318 maintains guest page tables (GPTs) 322. NPTs 320 (also referred to as extended page tables (EPTs)) map guest physical addresses to host physical addresses and are used in the second stage of address translation performed by CPU 106. GPTs 322 map guest virtual addresses to guest physical addresses and are used in the first stage of address translation performed by CPU 106.

Figure 4:
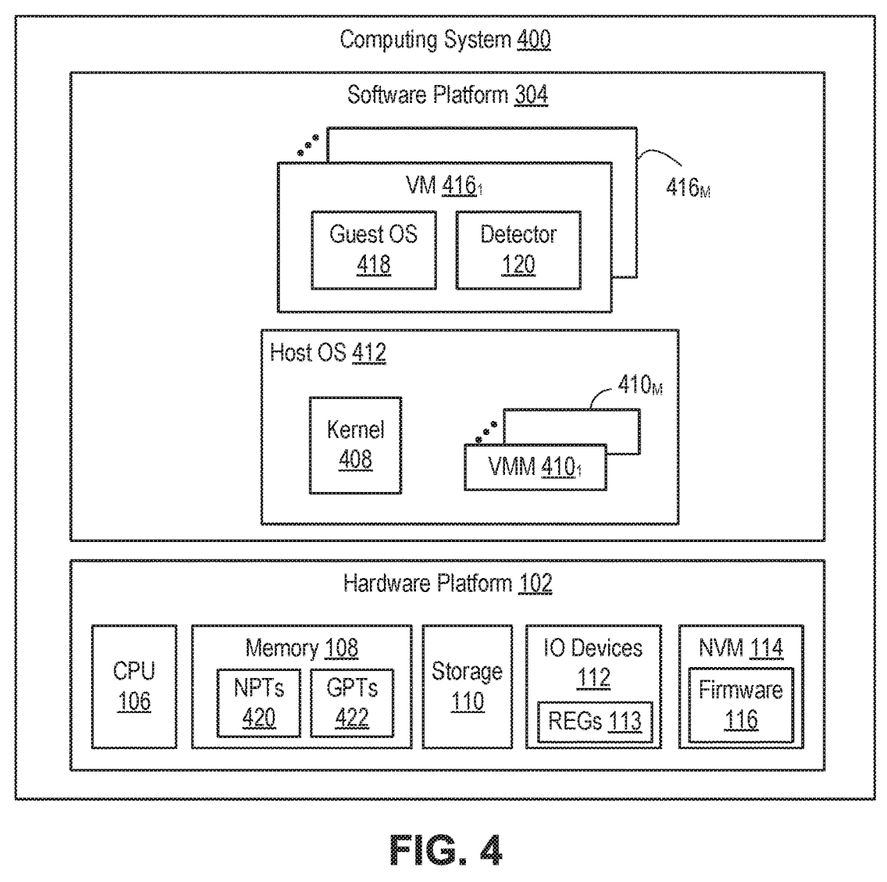
FIG. 4 is a block diagram depicting a computing system according to yet another embodiment.

FIG. 4 is a block diagram depicting a computing system 400 according to an embodiment. Elements of FIG. 4 that are the same or similar to those of FIG. 1 are designated with identical reference numerals. Computing system 400 includes a software platform 404 executing on hardware platform 102. Hardware platform 102 is configured as described above with respect to FIGS. 1-2.

In the embodiment of FIG. 4, software platform 304 includes a host OS 412 that executes directly on hardware platform 102. Host OS 412 includes a kernel 408 and VMMs $410_1 \ldots 410_M$. VMMs $410_1 \ldots 410_M$ support VMs $416_1 \ldots 416_M$, respectively. VMMs 410 operate similar to VMMs 310 described above in FIG. 3. Each VM 416 includes a guest OS 418 and detector 120, similar to each VM 316 described above in FIG. 3. Host OS 412 maintains NPTs 420, and each guest OS 418 maintains GPTs 422. The difference between computing system 400 and computing system 300 is that the VMMs 410 function as Type-2 or "hosted" virtualization software. Kernel 308 and VMMs 410 execute at PL2. Guest OS 418 executes at PL1. Detector 120 executes at PL1 or PL0.

Figure 5:
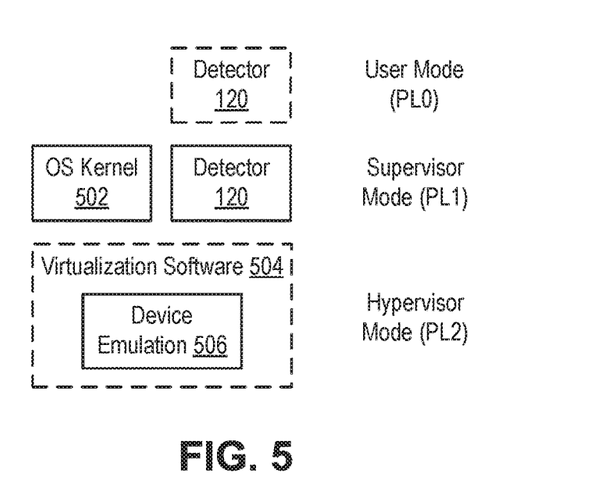
FIG. 5 is a block diagram depicting a logical view of a software platform executing on a computing system according to an embodiment.

FIG. 5 is a block diagram depicting a logical view of a software platform executing on a computing system according to an embodiment. The software platform includes an OS kernel 502 and detector 120 executing in a supervisor mode (PL1). In some embodiments, detector 120 executes in user mode (PL0). In some computing systems, OS kernel 502 and detector 120 execute directly on the hardware platform without the presence of virtualization. In other computing systems, the software platform includes virtualization software 504. As described in the embodiments above, virtualization software 504 can include Type-1 virtualization software (e.g., hypervisor 306) or Type-2 virtualization software (e.g., VMMs 410). Virtualization software 504, if present, executes in hypervisor mode (PL2). Virtualization software 504 can implement device emulation 506 for one or more IO devices in the hardware platform of the computing system. Virtualization software 504 also sets one or more traps. When a trap is triggered, the CPU generates an exception to PL2. For example, virtualization software 504 can program PL2 system registers to set traps for access to PL1 and/or PL0 system registers. The traps are triggered if code executing at PL1 or PL0 attempts to access the trapped PL1 and/or PL0 system registers. In another example, virtualization software 504 can configure the NPTs to set traps for MMIO access to IO devices for which virtualization software 504 provides device emulation 506. The traps are triggered if code executing at PL1 or PL0 attempts MMIO access to the IO devices for which virtualization software 504 provides device emulation 506.

Figure 6:
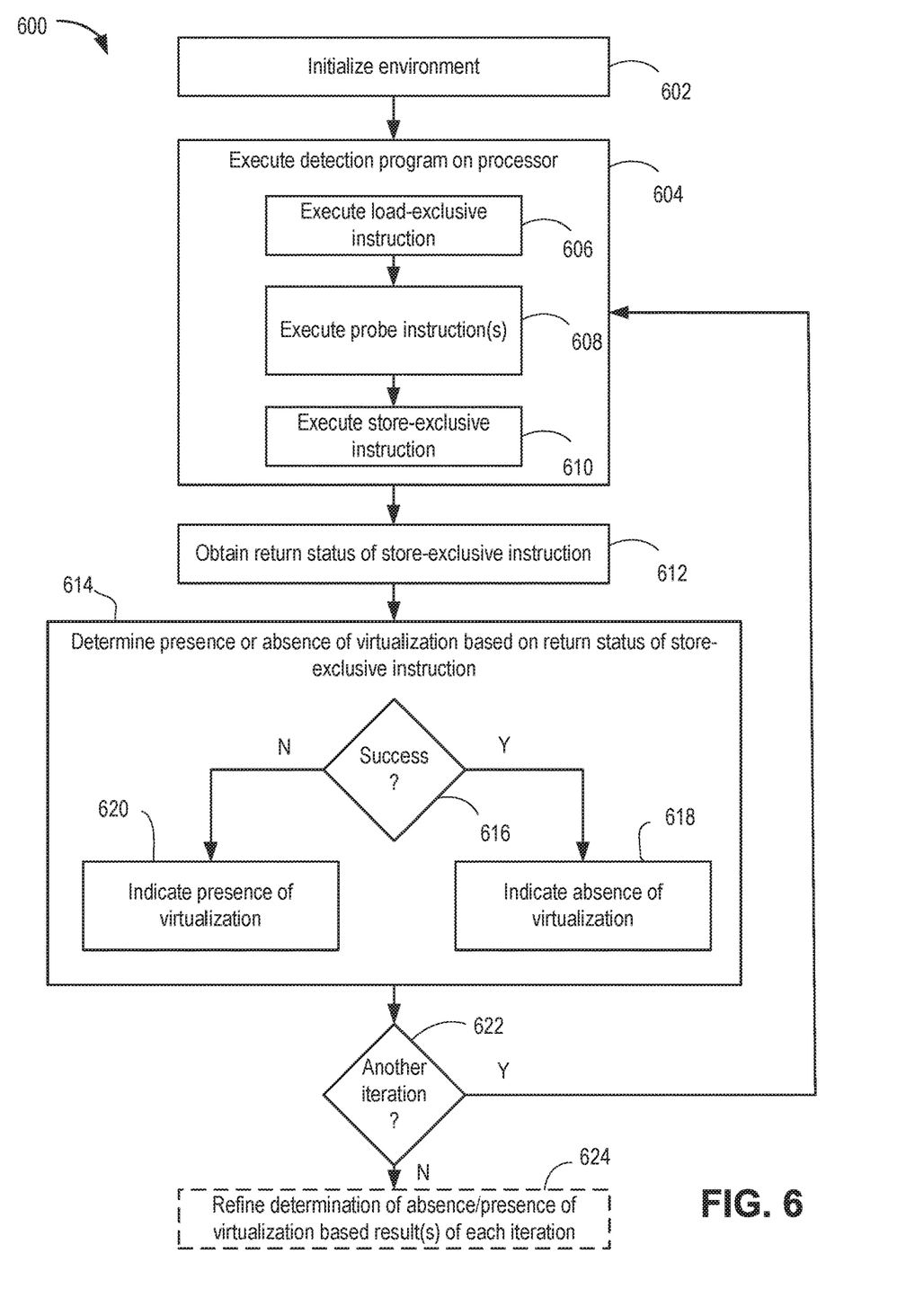
FIG. 6 is a flow diagram depicting a method of detecting virtualization in a computing system according to an embodiment.

FIG. 6 is a flow diagram depicting a method 600 of detecting virtualization in a computing system according to an embodiment. Method 600 may be executed as software on computing system 100 or computing system 400. Method 600 can be performed safely on computing system 100 through execution of detector 120. In such case, detector 120 can determine absence of virtualization. Method 600 can be performed safely on computing system 300 or 400 through execution of detector 120 in a VM. In such case, detector 120 can determine presence of virtualization.

Method 600 begins at step 602, where detector 120 initializes the computing environment. In an embodiment, detector 120 ensures that the code is executing on a single core 202 of CPU 106 and configures core 202 to disable asynchronous exceptions (e.g., interrupts disabled). As described below, detector 120 relies on the generation of exceptions from its own probe instructions and thus exceptions generated asynchronously would interfere with operation of detector 120. Further, detector 120 relies on the state of local monitor 216, which is local to a given core 202. Executing detector 120 in threads on different cores 202 each having different local monitor states can interfere with the detection process. Method 600 proceeds from step 602 to step 604.

At step 604, detector 120 executes a detection program on the processor (e.g., a core 202). In an embodiment, the program includes an exclusive load-exclusive instruction, followed by one or more probe instructions, followed by a store-exclusive instruction. Thus, at step 606, detector 120 executes a load-exclusive instruction. The load-exclusive instruction can read from any normal memory location (e.g., on the stack). Execution of the load-exclusive instruction sets local monitor 216 for core 202.

At step 608, detector 120 executes one or more probe instructions. A probe instruction is an instruction capable of being trapped to PL2. That is, a probe instruction is an instruction that may trigger a trap set by virtualization software executing at PL2. Thus, execution of probe instruction(s) at step 608 may generates exception(s) directed to PL2.

Example instructions capable of being trapped to PL2 include instructions that access certain PL0 registers 206 and/or certain PL1 registers 208 for which PL2 traps can be set (e.g., CPU ID registers, debug registers, kernel generic timer registers, etc.). Virtualization software typically traps and controls guest software access to these certain PL0 and PL1 registers. Another type of instruction that is capable of being trapped to PL2 is a load or store instruction targeting a memory-mapped register of an IO device 112 that is being emulated by the virtualization software. Detector 120 can attempt to perform MIMO to an IO device 112 that is typically emulated by virtualization software. The virtualization software typically prevents guest software from directly accessing an IO device that is being emulated. Attempting to directly access an IO device being emulated can cause an access violation during second stage address translation, resulting in generation of an exception to PL2. In general, detector 120 can execute a load or store instruction targeting any address that is expected to be protected by virtualization software through an access control mechanism that causes an exception to be generated targeting PL2. In an embodiment, detector 120 probes IO devices that are unlikely to be directly attached to a VM using device assignment (e.g., direct attachment of a device to the VM so that the device is not emulated).

The instruction set of core 202 can include a hypercall instruction that causes an exception to PL2. For example, the A64 instruction set of an ARM®v8-compliant processor includes the HVC instruction, which allows software executing at EL1 to call a hypervisor executing at EL2 to request a service. However, the behavior of the hypercall instruction can be undefined if PL2 is not configured on core 202 (i.e., virtualization software is not present). Thus, a hypercall without the presence of a hypervisor may lead to a system crash. Alternatively, virtualization software may reflect a hypercall back into the guest software as an unknown exception. Such a feature may be exhibited by a malicious hypervisor to avoid detection by guest software. The probe instruction(s) executed at step 608 test for the presence of virtualization software in a safe manner, as opposed to attempting execution of a hypercall instruction.

At step 610, detector 120 executes a store-exclusive instruction that is paired with the load-exclusive instruction. The store-exclusive instruction targets the same address read from by the load-exclusive instruction. As discussed above, the store-exclusive instruction will succeed if local monitor 216 is set and will not succeed if local monitor 216 is unset. Notably, if any probe instruction executed during step 608 results in core 202 generating an exception, core 202 clears local monitor 216. In such case, the store-exclusive instruction will not succeed at step 610.

In general, the probe instruction(s) executed during step 608 are likely to generate exception(s) if executed by guest software (e.g., detector 120 in a VM), since it is likely that virtualization software would trap the probe instruction(s). In contrast, the probe instruction(s) executed during step 608 are not likely to generate exception(s) if executed by host software (e.g., detector 120 in software platform 104), since there is no virtualization software present (i.e., PL2 is not configured for use on core 202).

Method 600 proceeds from step 604 to step 612, where detector 120 obtains the return status of the store-exclusive instruction executed at step 610. Detector 120 can read the return status from a designated register of core 202. The return status is indicative of the state of local monitor 216.

At step 614, detector 120 determines presence or absence of virtualization based on the status of the store-exclusive instruction. In an embodiment, at step 616, detector 120 determines whether the status of the store-exclusive instruction indicates success. If not, method 600 proceeds to step 620, where detector 120 indicates presence of virtualization. For example, detector 120 can indicate presence of virtualization software, such as a hypervisor or VMM. In another example, detector 120 can indicate presence of device emulation (e.g., if the probe instruction(s) attempted MMIO access to an IO device).

If at step 616 detector 120 determines that the store-exclusive instruction was successful, method 600 proceeds to step 618. At step 618, detector indicates absence of virtualization. For example, detector 120 can indicate absence of virtualization software, such as a hypervisor or VMM. In another example, detector 120 can indicate absence of device emulation (e.g., if the probe instruction(s) attempted MMIO access to an IO device).

Method 600 proceeds from step 614 to step 622, where detector 120 determines if another detection iteration should be performed. If so, method 600 returns to step 604 and repeats for another detection iteration. For example, detector 120 can execute different probe instruction(s) at step 608 from one detection iteration to the next. If at step 622 no more detection iterations are to be performed, method 600 can end. Optionally, at step 624, detector 120 can refine the determination of absence/presence of virtualization based on the combined results of all detection iterations. For example, it is not certain that a given probe instruction will generate an exception even if detector 120 is executing in a virtual environment. For example, virtualization software may not trap access to the particular system register(s) accessed by the probe instruction(s) executed at step 608. The IO device tested at step 608 may be directly attached to the VM through device assignment. Thus, in some embodiments, detector 120 attempts to generate an exception during step 608 using different kinds of probe instructions to increase the likelihood of detecting virtualization and/or increase the confidence that virtualization is or is not present.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of detecting virtualization in a computing system, which includes a processor having at least three hierarchical privilege levels including a third privilege level more privileged than a second privilege level, the second privilege level more privileged than a first privilege level, the method comprising:

executing a program on the processor at a privilege level less privileged than the third privilege level, the program including: a load-exclusive instruction of the processor, followed by at least one instruction of the processor capable of being trapped to the third privilege level, followed by a store-exclusive instruction of the processor; and indicating presence or absence of virtualization software at least a portion of which executes at the third privilege level in response to a return status, accessed from a register of the processor, of the store-exclusive instruction.

2. The method of claim 1, wherein the at least one instruction comprises an instruction that reads a system register of the processor.

3. The method of claim 1, wherein the virtualization software comprises a hypervisor or virtual machine monitor (VMM).

4. The method of claim 1, wherein the at least one instruction comprises an instruction that accesses a memory mapped input/output (MMIO) address associated with an IO device.

5. The method of claim 4, further comprising:
   determining whether the IO device is an emulated device or a hardware device in response to the return status of the store-exclusive instruction.

6. The method of claim 1, wherein the step of indicating comprises:
   indicating presence of the virtualization software in response to a failure of the store-exclusive instruction.

7. The method of claim 1, wherein the step of indicating comprises:
   indicating absence of the virtualization software in response to success of the store-exclusive instruction.

8. A non-transitory computer readable medium having instructions stored thereon that when executed by a processor cause the processor to perform a method of detecting virtualization in a computing system, which includes a processor having at least three hierarchical privilege levels including a third privilege level more privileged than a second privilege level, the second privilege level more privileged than a first privilege level, the method comprising:
   executing a program on the processor at a privilege level less privileged than the third privilege level, the program including: a load-exclusive instruction of the processor, followed by at least one instruction of the processor capable of being trapped to the third privilege level, followed by a store-exclusive instruction of the processor; and
   indicating presence or absence of virtualization software at least a portion of which executes at the third privilege level in response to a return status, accessed from a register of the processor, of the store-exclusive instruction.

9. The non-transitory computer readable medium of claim 8, wherein the at least one instruction comprises an instruction that reads a system register of the processor.

10. The non-transitory computer readable medium of claim 8, wherein the virtualization software comprises a hypervisor or virtual machine monitor (VMM).

11. The non-transitory computer readable medium of claim 8, wherein the at least one instruction comprises an instruction that accesses a memory mapped input/output (MMIO) address associated with an IO device.

12. The non-transitory computer readable medium of claim 11, further comprising:
   determining whether the IO device is an emulated device or a hardware device in response to the return status of the store-exclusive instruction.

13. The non-transitory computer readable medium of claim 8, wherein the step of indicating comprises:
   indicating presence of the virtualization software in response to a failure of the store-exclusive instruction.

14. The non-transitory computer readable medium of claim 8, wherein the step of indicating comprises:
   indicating absence of the virtualization software in response to success of the store-exclusive instruction.

15. A computing system, comprising:
   a hardware platform having a processor and a memory, the processor having at least three hierarchical privilege levels including a third privilege level more privileged than a second privilege level, the second privilege level more privileged than a first privilege level;
   a software platform executing on the hardware platform, the software platform including a detector, the detector comprising program code executed by the processor and configured to:
      execute a program on the processor at a privilege level less privileged than the third privilege level, the program including: a load-exclusive instruction of the processor, followed by at least one instruction of the processor capable of being trapped to the third privilege level, followed by a store-exclusive instruction of the processor; and
      indicate presence or absence of virtualization software in the software platform at least a portion of which executes at the third privilege level in response to a return status, accessed from a register of the processor, of the store-exclusive instruction.

16. The computing system of claim 15, wherein the at least one instruction comprises an instruction that reads a system register of the processor.

17. The computing system of claim 15, wherein the at least one instruction comprises an instruction that accesses a memory mapped input/output (MMIO) address associated with an IO device.

18. The computing system of claim 17, wherein the program code of the detector is further executed by the processor to:
   determine whether the IO device is an emulated device or a hardware device in response to the return status of the store-exclusive instruction.

19. The computing system of claim 15, wherein the program code of the detector is further executed by the processor to:
   indicate presence of the virtualization software in response to a failure of the store-exclusive instruction.

20. The computing system of claim 15, wherein the program code of the detector is further executed by the processor to:
   indicate absence of the virtualization software in response to success of the store-exclusive instruction.

* * * * *

UNITED STATES PATENT AND TRADEMARK OFFICE
CERTIFICATE OF CORRECTION

PATENT NO. : 10,698,783 B2
APPLICATION NO. : 15/865770
DATED : June 30, 2020
INVENTOR(S) : Andrei Warkentin et al.

It is certified that error appears in the above-identified patent and that said Letters Patent is hereby corrected as shown below:

In the Specification

Column 2, Line 22: [[(10)]] should read (IO)

Signed and Sealed this
Thirteenth Day of October, 2020

Andrei Iancu
*Director of the United States Patent and Trademark Office*